United States Patent
Kin et al.

(10) Patent No.: US 9,257,902 B2
(45) Date of Patent: Feb. 9, 2016

(54) DEVICE FOR POWER CONVERSION USING SWITCHING ELEMENT

(75) Inventors: Kanretsu Kin, Chiryu (JP); Shinya Goto, Gifu (JP); Shigeo Hirashima, Nagoya (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 152 days.

(21) Appl. No.: 13/479,487

(22) Filed: May 24, 2012

(65) Prior Publication Data

US 2012/0300512 A1 Nov. 29, 2012

(30) Foreign Application Priority Data

May 24, 2011 (JP) ................... 2011-115574
Apr. 6, 2012 (JP) ................... 2012-087001

(51) Int. Cl.
*H02M 1/12* (2006.01)
*H02M 1/44* (2007.01)
*H02M 3/335* (2006.01)

(52) U.S. Cl.
CPC ............ *H02M 1/44* (2013.01); *H02M 3/33507* (2013.01)

(58) Field of Classification Search
CPC .... H02M 3/335; H02M 3/33507; H02M 1/44
USPC .................. 363/15, 16, 21.01–21.18, 97, 131
See application file for complete search history.

(56) References Cited

U.S. PATENT DOCUMENTS

| 5,068,777 | A | * | 11/1991 | Ito ........................... H02P 27/08 318/811 |
| 6,043,996 | A | * | 3/2000 | Kumar ................ H02M 7/5395 318/375 |
| 7,425,781 | B2 | * | 9/2008 | Goto et al. ..................... 307/139 |
| 2004/0059484 | A1 | * | 3/2004 | Nakaya et al. .................. 701/36 |
| 2006/0140286 | A1 | | 6/2006 | Goto et al. |
| 2006/0221654 | A1 | * | 10/2006 | Kawasaki et al. ............... 363/39 |

FOREIGN PATENT DOCUMENTS

| JP | H11-122911 | 4/1999 |
| JP | H11-206122 | 7/1999 |
| JP | 2000-224840 A | 8/2000 |
| JP | 2002-095255 A | 3/2002 |
| JP | 2002-335672 A | 11/2002 |
| JP | 2006-187173 A | 7/2006 |
| JP | 2006-288103 | 10/2006 |

OTHER PUBLICATIONS

Office Action (2 pages) dated Mar. 31, 2015, issued in corresponding Japanese Application No. 2012-087001 and English translation (1 page).

* cited by examiner

*Primary Examiner* — Adolf Berhane
*Assistant Examiner* — Afework Demisse
(74) *Attorney, Agent, or Firm* — Nixon & Vanderhye PC

(57) ABSTRACT

A converter is provided as a power conversion device. The converter includes a switching circuit that performs switching on the basis of switching signals; and a control circuit that changes switching frequency of switching signals in a predetermined pattern with the elapse of time, and repeats the changes in switching frequency in the predetermined pattern at every repetition time. The converter sets the repetition time such that a repetition frequency that is the inverse of the repetition time does not coincide with a frequency band that can be demodulated as sound by a radio that receives radio broadcasts.

21 Claims, 2 Drawing Sheets

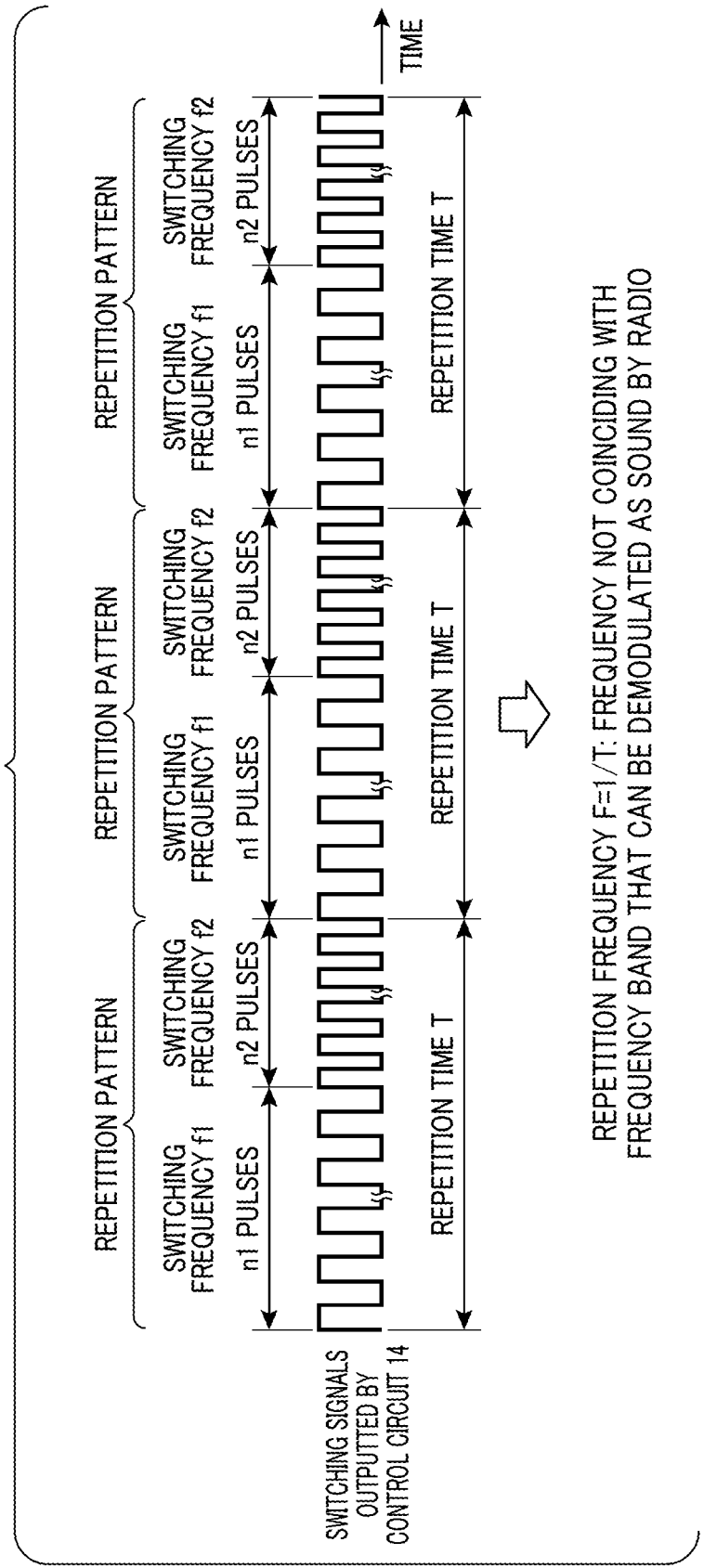

DEVICE FOR POWER CONVERSION USING SWITCHING ELEMENT

CROSS-REFERENCE TO RELATED APPLICATION

This application is based on and claims the benefit of priorities from earlier Japanese Patent Application Nos. 2011-115574 and 2012-087001 filed May 24, 2011 and Apr. 6, 2012, respectively, the descriptions of which are incorporated herein by reference.

BACKGROUND OF THE INVENTION

1. Field of the Invention

The present invention relates to a power conversion device including a switching circuit and a control circuit.

2. Description of the Related Art

As a power conversion device including a switching circuit and a control circuit, for example, an on-board direct current-to-direct current (DC-DC) converter disclosed in JP-B-4198677 is known.

The on-board DC-DC converter includes a DC-DC converter and a controller. The DC-DC converter has a metal-oxide-semiconductor (MOS) power transistor. The controller repeats a plurality of pulse signals having differing cycles in a predetermined sequence, and outputs the pulse signals as switching signals. In other words, the controller changes switching frequency of the switching signals in a predetermined pattern. In addition, the controller repeats the changes in the predetermined pattern at every repetition time. As a result, the switching frequencies are dispersed. Therefore, compared to when the switching frequency is fixed, the maximum value of the power spectrum can be suppressed. As a result, noise interfering with radios can be reduced.

However, in the above-described on-board DC-DC converter, a power spectrum is newly generated that corresponds with a repetition frequency that is the inverse of the repetition time. When the repetition frequency is in a frequency band that can be demodulated as sound by a radio, abnormal noise is generated from the radio. A problem occurs in that passengers in the vehicle experience discomfort.

SUMMARY

Hence it is desired to provide a power conversion device capable of suppressing abnormal noise accompanying noise of a repetition frequency component that is introduced into a radio, when changes in switching frequency in a predetermined pattern are repeated.

As a result of keen research and repeated experimentation conducted to solve this issue, the inventors have found that, by setting the repetition frequency so as not to coincide with frequency bands that can be demodulated as sound by a radio, abnormal noise accompanying noise of a repetition frequency component that is introduced into a radio can be suppressed.

In other words, according to an aspect of the power conversion device, the power conversion device includes: a switching circuit that performs switching on the basis of switching signals; and a control circuit that changes switching frequency of the switching signals in a predetermined pattern with the elapse of time, and repeats the changes in switching frequency in the predetermined pattern at every repetition time. The repetition time is set such that a repetition frequency that is the inverse of the repetition time does not coincide with a frequency band that can be demodulated as sound by a radio that receives radio broadcasts.

As a result of the configuration, the repetition frequency is set to a frequency other than the frequencies in the frequency band that can be demodulate as sound. Therefore, the repetition frequency does not coincide with a frequency band that can be demodulated as sound by a radio that receives radio broadcasts. As a result, even when noise of a repetition frequency component is introduced, the radio cannot demodulate the noise as sound. Therefore, abnormal noise accompanying the noise of the repetition frequency component can be suppressed.

BRIEF DESCRIPTION OF THE DRAWINGS

In the accompanying drawings:

FIG. 2 is a waveform diagram of switching signals outputted by a control circuit in FIG. 1.

DETAILED DESCRIPTION OF THE PREFERRED EMBODIMENTS

Figure 1:
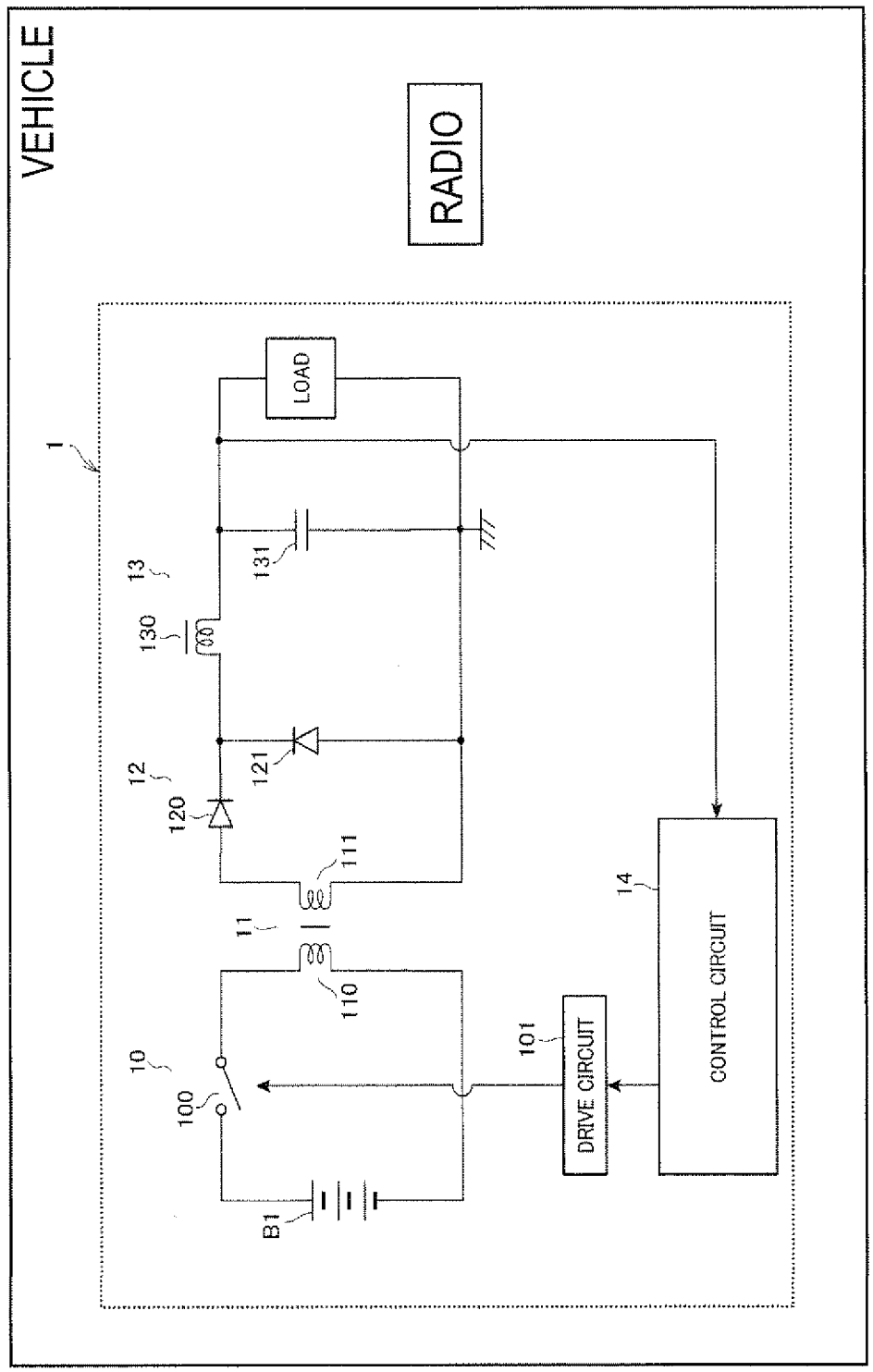
FIG. 1 is a circuit diagram of a converter according to an embodiment of a power conversion device of the present invention.

Next, the present invention will be described in further detail according to an embodiment. According to the present embodiment, an example is given in which a power conversion device of the present invention is mounted in a vehicle, together with a radio that receives amplitude modulation (AM) broadcasts and frequency modulation (FM) broadcasts. In addition, according to the present embodiment, an example is given in which the present invention is applied to a converter that supplies a boosted direct current voltage to a load that is similarly mounted in the vehicle.

Hereinafter, "a frequency band that can be demodulated as sound by a radio" is referred to simply as "a broadcast frequency band". Hereinafter, frequency bands other than the broadcast frequency band are referred to as "non-broadcast frequency bands". The broadcast frequency band is equivalent to an "audio range". Specifically, the broadcast frequency band includes a carrier wave frequency (also referred to as a center frequency) for each broadcast station in AM (amplitude modulation) broadcasting, and an occupied frequency band (in other words, a frequency band occupied by a carrier wave frequency and a signal wave frequency) for each broadcast station in FM (frequency modulation) broadcasting.

First, a configuration of the converter according to the present embodiment will be described with reference to FIG. 1 and FIG. 2. Here, FIG. 1 is a circuit diagram of the converter according to an embodiment of the power conversion device of the present invention. FIG. 2 is a waveform diagram of switching signals outputted by a control circuit in FIG. 1.

A converter 1 shown in FIG. 1 is mounted in a vehicle, together with a radio that receives AM broadcasts and FM broadcasts. The converter 1 isolates and reduces a direct current voltage outputted from a battery B1 that is similarly mounted in the vehicle. The converter 1 then supplies the reduced direct current voltage to a load L1. The converter 1 includes a switching circuit 10, a transformer 11, a rectifier circuit 12, a smoothing circuit 13, and a control circuit 14.

The switching circuit 10 performs switching on the basis of switching signals, thereby converting the direct current voltage of the battery B1 to an alternating current voltage. The switching circuit 10 includes a switching element 100 and a drive circuit 101.

The switching element 100 is used to convert the direct current voltage of the battery B1 to the alternating current voltage by being switched. One end of the switching element 100 is connected to a positive terminal of the battery B1. The other end of the switching element 100 is connected to the transformer 11. In addition, a control terminal of the switching element 100 is connected to the drive circuit 101.

The drive circuit 101 is used to switch the switching element 100 on the basis of the switching signals. The drive circuit 101 is connected to the control terminal of the switching element 100. In addition, an input terminal for switching signals of the drive circuit 101 is connected to the control circuit 14.

The transformer 11 isolates and reduces the alternating current voltage converted by the switching circuit 10. The transformer 11 includes a primary winding 110 and a secondary winding 111. One end of the primary winding 110 is connected to the other end of the switching element 100. The other end of the primary winding 110 is connected to a negative terminal of the battery B1. One end and the other end of the secondary winding 111 are each connected to the rectifier circuit 12.

The rectifier circuit 12 rectifies the alternating current voltage that has been reduced by the transformer 11 and converts the rectified alternating current voltage to a direct current voltage. The rectifier circuit 12 includes diodes 120 and 121. An anode of the diode 120 is connected to one end of the secondary winding 111. A cathode of the diode 120 is connected to the smoothing circuit 13. An anode of the diode 121 is connected to the other end of the secondary winding 111. A cathode of the diode 121 is connected to the smoothing circuit 13.

The smoothing circuit 13 smoothens the direct current voltage converted by the rectifier circuit 12 and supplies the direct current voltage to the load L1. The smoothing circuit 13 includes a coil 130 and a capacitor 131. One end of the coil 130 is connected to the cathodes of the diodes 120 and 121. The other end of the coil 130 is connected to a positive terminal of the load L1. One end of the capacitor 131 is connected to the other end of the coil 130. The other end of the capacitor 131 is connected to the anode of the diode 121 and a negative terminal of the load L1.

The control circuit 14 outputs the switching signals of which a duty ratio for switching the switching element 100 has been adjusted such that the output voltage of the converter 1 becomes a predetermined voltage for which a command has been given. An output voltage detection terminal of the control circuit 14 is connected to the other end of the coil 130. A switching signal output terminal of the control circuit 14 is connected to a switching signal input terminal of the drive circuit 101.

The control circuit 14 changes the switching frequency of the switching signals in a repetition pattern (predetermined pattern) with the elapse of time. In addition, the control circuit 14 repeats the changes in switching frequency in the repetition pattern at every repetition time. Specifically, as shown in FIG. 2, the control circuit 14 changes the switching frequency from f1 to f2 ($\neq$f1) with the elapse of time. In addition, the control circuit 14 repeats the change from f1 to f2, and repeats this change at every time T.

Here, the repetition time T is set such that a repetition frequency F that is the inverse of the repetition time T is higher than a maximum frequency 15 kHz that can be demodulated as sound by the radio that receives AM broadcasts and FM broadcasts mounted in the vehicle. In other words, the control circuit 14 includes a recording medium (in particular, a non-volatile memory, such as a read-only memory [ROM]) (not shown). The repetition frequency F and the repetition time T are stored in the recording medium in advance.

Specifically, the number of pulses of the switching signal outputted at the switching frequency f1 is set to n1 and the number of pulses of the switching signal outputted at the switching frequency f2 is set to n2, such that the repetition frequency F does not coincide with the broadcast frequency band (audio range). In other words, the repetition frequency F is set to a frequency other than (i.e., is shifted from) the frequencies in the broadcast frequency band (audio range). When the frequency is increased, the frequency is set to be higher than 10 kHz for AM broadcasts and set to be higher than 15 kHz for FM broadcasts. The upper-limit frequency when increasing the frequency is generally 20 kHz. However, as long as the frequency does not coincide with the broadcast frequency band, the frequency may be 20 kHz or higher. Similarly, when the frequency is decreased, the frequency is set to be lower than 200 Hz for both AM broadcasts and FM broadcasts. As a result of the frequency being set in a manner such as described above, the repetition frequency F becomes a frequency in a non-broadcast frequency band and does not coincide with the broadcast frequency band.

For AM broadcasts and FM broadcasts, one repetition frequency F or more among the repetition frequencies F below is arbitrarily selected and set. Specific values of the frequencies below are examples pertaining to Japan and will differ depending on the country and region.

(a) A repetition frequency F that is lower than the smallest broadcast frequency band used for long-wave (mainly a frequency band of 530 kHz or lower) radio broadcasting;

(b) a repetition frequency F that is set to fall between a frequency higher than the largest broadcast frequency band used for long-wave radio broadcasting and a frequency lower than the smallest broadcast frequency band used for medium-wave (mainly a frequency band around 530 kHz to 1620 kHz) radio broadcasting;

(c) a repetition frequency F that is set to fall between a frequency higher than the largest broadcast frequency band used for medium-wave radio broadcasting and a frequency lower than the smallest broadcast frequency band used for short-wave (mainly a frequency band from 1.6 MHz to 30 MHz) radio broadcasting;

(d) a repetition frequency F that is set to fall between a frequency higher than the largest broadcast frequency band used for short-wave radio broadcasting and a frequency lower than the smallest broadcast frequency band used for radio broadcast using very-high-frequency (mainly a frequency band from 30 MHz to 300 MHz) radio broadcasting; and (e) a repetition frequency F that is set to fall between a frequency higher than the largest broadcast frequency band used for radio broadcasting in a very-high-frequency band and a frequency lower than the smallest broadcast frequency band used for television broadcasting.

In other words, the repetition frequency F is merely required to be set so as not to coincide with the broadcast frequency bands allocated to each broadcast station performing AM broadcasts and FM broadcasts. The broadcast frequency band that is allocated differs depending on the country and region.

Next, an operation of the converter 1 will be described with reference to FIG. 1 and FIG. 2. The control circuit 14 shown in FIG. 1 changes the output voltage of the converter 1 to a predetermined voltage for which a command has been given. Therefore, the control circuit 14 outputs the switching signals of which the duty ratio for switching the switching element 100 has been adjusted. The drive circuit 101 turns ON and OFF the switching element 100 at predetermined timings in accordance with the switching signals outputted by the control circuit 14. When the switching element 100 is turned ON and OFF, the direct current voltage of the battery B1 is converted to an alternating current voltage. The transformer 11 isolates and reduces the alternating current voltage converted by the switching circuit 10. The rectifier circuit 12 rectifies the alternating current voltage reduced by the transformer 11 and converts the rectified alternating current voltage to a direct current voltage. The smoothing circuit 13 smoothens the direct current voltage converted by the rectifier circuit 12 and supplies the direct current voltage to the load L1. As a result, the direct current voltage outputted from the battery B1 is isolated, reduced, and then supplied to the load L1.

As shown in FIG. 2, the control circuit 14 changes the switching frequency from f1 to f2 with the elapse of time. In addition, the control circuit 14 repeats the change from switching frequency f1 to switching frequency f2, and repeats the change at every time T. As a result, the switching frequencies are dispersed. Therefore, compared to when the switching frequency is fixed, the maximum value of the power spectrum can be suppressed. As a result, noise that is introduced into the radio can be reduced. Furthermore, the repetition frequency F is set to a frequency higher than the maximum frequency 15 kHz that can be demodulated as sound by the radio mounted in the vehicle. As a result, even when noise of a repetition frequency component is introduced, the radio cannot demodulate the noise as sound. Therefore, abnormal noise accompanying noise of the repetition frequency component can be suppressed.

Next, effects will be described. According to the present embodiment, as described above, abnormal noise that is introduced into the radio that receives AM broadcasts and FM broadcasts mounted in the vehicle, or in other words, abnormal noise accompanying noise of the repetition frequency component, can be suppressed when changes in switching frequency in a predetermined pattern are repeated. The predetermined pattern is described using the switching frequencies f1 and f2. However, a pattern composed of three or more switching frequencies may also be used (the repetition sequence of the frequencies may be fixed or random). In this instance as well, effects similar to that according to the present embodiment can be achieved.

According to the present embodiment, an example is given in which the maximum frequency that can be demodulated as sound by the radio is 10 kHz or 15 kHz. The repetition time T is set such that the repetition frequency F is higher than 10 kHz or 15 kHz. In a similar manner, an example is given in which the minimum frequency that can be demodulated as sound by the radio is 200 Hz. The repetition time T is set such that the repetition frequency F is lower than 200 Hz. These repetition frequencies F and repetition times T are not limited thereto. The maximum frequency and the minimum frequency that can be demodulated as sound may differ. When the maximum frequency that can be demodulated as sound by the radio is a frequency of 8-15 kHz, the repetition time T is merely required to be set such that the repetition frequency F becomes higher than the frequency of 8-15 kHz in sequence. In a similar manner, when the minimum frequency that can be demodulated as sound by the radio is a frequency of 20-200 Hz, the repetition time T is merely required to be set such that the repetition frequency F becomes lower than the frequency of 20-200 Hz in sequence. Regardless of the repetition time T that is set, effects similar to that of the present embodiment can be achieved.

According to the present embodiment, an example is given in which the present invention is applied to the converter. However, the present invention is not limited thereto. The present invention may be applied to an inverter device that has a switching circuit and converts a direct current voltage to an alternating current voltage.

Furthermore, according to the present embodiment, an example is given in which the present invention is mounted in a vehicle, together with a radio that receives AM broadcasts and FM broadcasts. However, the present invention is not limited thereto. Similar effects can be achieved even when the present invention is mounted in a vehicle, together with a radio that receives only AM broadcasts or a radio that receives only FM broadcasts.

In addition, according to the present embodiment, an example is given in which the repetition time T is set such that the repetition frequency F is higher than the maximum frequency that can be demodulated as sound by the radio. However, the present invention is not limited thereto.

In addition, the repetition time T may be set such that the repetition frequency F is higher than the maximum frequency of the voice band of radio broadcasts. In this instance, the repetition frequency F is set to be higher than the maximum frequency of the voice band of radio broadcasts radio broadcasts. Therefore, even when noise of the repetition frequency component is introduced, the radio cannot demodulate the noise as sound. In other words, the radio does not consider the noise to be a voice component. As a result, abnormal noise accompanying noise of the repetition frequency component can be suppressed.

In a similar manner, the repetition time T may be set such that the repetition frequency F is lower than the minimum frequency of the voice band of the radio broadcasts. In this instance, the repetition frequency F is set to be lower than the minimum frequency of the voice band of radio broadcasts radio broadcasts. Therefore, even when noise of the repetition frequency component is introduced, the radio cannot demodulate the noise as sound. In other words, the radio does not consider the noise to be a voice component. As a result, abnormal noise accompanying noise of the repetition frequency component can be suppressed.

According to the present embodiment, an example is given in which the repetition frequency F and the repetition time T are stored in advance in a recording medium (in particular, a non-volatile memory, such as a ROM) included in the control circuit 14. However, the present invention is not limited thereto. As described above, the broadcast frequency band that is allocated differs depending on the country and region. Therefore, a configuration is also possible in which the repetition frequency F and the repetition time T are selected such that the repetition frequency F does not coincide with (i.e., is shifted from) the broadcast frequency band allocated to the country or region in which the converter 1 (or the vehicle) is positioned. Selection may be made such that the repetition frequency F does not coincide with any of the broadcast frequency bands allocated to a country (or an adjacent country). Alternatively, selection may be made such that the repetition frequency F does not coincide with a broadcast frequency band allocated to each region. Regardless of the selection made to set the repetition frequency F and the repetition time T, effects similar to that according to the present embodiment can be achieved.

According to the present embodiment, the radio broadcast is merely required to be at least either AM broadcasts or FM broadcasts. Therefore, abnormal noise accompanying noise of the repetition frequency component can be suppressed in a radio that receives at least either AM broadcasts or FM broadcast. The AM broadcasts and the FM broadcasts may be analog broadcasts or digital broadcasts.

In addition, the power conversion device according to the present embodiment is mounted in the vehicle, together with a radio. According to this configuration, abnormal noise accompanying noise of repetition frequency component can be suppressed in the radio mounted in the vehicle.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A power conversion device comprising:
   a switching circuit provided with a switching element that performs switching operations for power conversion on a basis of a switching frequency of a switching signal provided to the switching element; and
   a control circuit that controls the switching signal such that the switching frequency is repeatedly changed, in each repetition time, in accordance with a predetermined pattern of changes in frequency, the predetermined pattern being set with an elapse of time, the repetition time being set such that a repetition frequency, which is an inverse of the repetition time, is shifted from, at least, a frequency band whose frequencies are demodulated as sound by a radio that receives radio broadcasting, and the repetition time being a period of time during which a plurality of pulse signals having differing cycles are repeated in a predetermined sequence.

2. The power conversion device of claim 1, wherein the repetition time is set such that the repetition frequency is higher than a maximum frequency of the frequency band.

3. The power conversion device of claim 2, wherein the radio broadcasting is either AM broadcasting or FM broadcasting.

4. A system comprising:
   the power conversion device of claim 3,
   a radio for receiving the radio broadcasting,
   wherein the power conversion device and the radio for receiving the radio broadcasting are equipped in a vehicle.

5. The power conversion device of claim 4, wherein the control circuit is equipped with a recording medium in which (i) data indicative of the repetition time and (ii) the repetition time are stored in advance.

6. The power conversion device of claim 1, wherein the repetition time is set such that the repetition frequency is lower than a minimum frequency of the frequency band.

7. The power conversion device of claim 6, wherein the radio broadcasting is either AM broadcasting or FM broadcasting.

8. A system comprising:
   the power conversion device of claim 7, and
   a radio for receiving the radio broadcasting,
   wherein the power conversion device and the radio for receiving the radio broadcasting are equipped in a vehicle.

9. The power conversion device of claim 8, wherein the control circuit is equipped with a recording medium in which (i) data indicative of the repetition time and (ii) the repetition time are stored in advance.

10. The power conversion device of claim 1, wherein the radio broadcasting is either AM broadcasting or FM broadcasting.

11. A system comprising:
    the power conversion device of claim 10, and
    a radio for receiving the radio broadcasting,
    wherein the power conversion device and the radio for receiving the radio broadcasting are equipped in a vehicle.

12. The power conversion device of claim 11, wherein the control circuit is equipped with a recording medium in which (i) data indicative of the repetition time and (ii) the repetition time are stored in advance.

13. A power conversion device comprising:
    a switching circuit provided with a switching element that performs switching operations for power conversion on the basis of a switching frequency of a switching signal provided to the switching element; and
    a control circuit that controls the switching signal such that the switching frequency is repeatedly changed, in each repetition time, in accordance with a predetermined pattern of changes in frequency, the predetermined pattern being set with an elapse of time, the repetition time being set such that a repetition frequency, which is an inverse of the repetition time, is shifted from, at least, a voice band of radio broadcasting, and the repetition time being a period of time during which a plurality of pulse signals having differing cycles are repeated in a predetermined sequence.

14. The power conversion device of claim 13, wherein the repetition time is set such that the repetition frequency is higher than a maximum frequency of a voice band of the radio broadcasting.

15. The power conversion device of claim 14, wherein the radio broadcasting is either AM broadcasting or FM broadcasting.

16. The power conversion device of claim 15, wherein the power conversion device and a radio for receiving the radio broadcasting are equipped in a vehicle.

17. The power conversion device of claim 16, wherein the control circuit is equipped with a recording medium in which (i) data indicative of the repetition time and (ii) the repetition time are stored in advance.

18. The power conversion device of claim 13, wherein the repetition time is set such that the repetition frequency is lower than a minimum frequency of a voice band of the radio broadcasting.

19. The power conversion device of claim 18, wherein the radio broadcasting is either AM broadcasting or FM broadcasting.

20. The power conversion device of claim 19, wherein the power conversion device and a radio for receiving the radio broadcasting are equipped in a vehicle.

21. The power conversion device of claim 20, wherein the control circuit is equipped with a recording medium in which (i) data indicative of the repetition time and (ii) the repetition time are stored in advance.

* * * * *